(12) United States Patent
Duplys et al.

(10) Patent No.: US 10,402,170 B2
(45) Date of Patent: Sep. 3, 2019

(54) PROCESSING DEVICE AND OPERATING METHOD THEREFOR

(71) Applicant: Robert Bosch GmbH, Stuttgart (DE)

(72) Inventors: Paulius Duplys, Markgroeningen (DE); Benjamin Glas, Stuttgart (DE); Hamit Hacioglu, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 275 days.

(21) Appl. No.: 15/147,651

(22) Filed: May 5, 2016

(65) Prior Publication Data

US 2016/0344542 A1 Nov. 24, 2016

(30) Foreign Application Priority Data

May 19, 2015 (DE) .................. 10 2015 209 123

(51) Int. Cl.
*H04L 9/00* (2006.01)
*G06F 7/58* (2006.01)

(52) U.S. Cl.
CPC .............. *G06F 7/588* (2013.01); *G06F 7/582* (2013.01); *H04L 9/002* (2013.01); *H04L 2209/12* (2013.01)

(58) Field of Classification Search
None
See application file for complete search history.

(56) References Cited

U.S. PATENT DOCUMENTS

| | | | | |
|---|---|---|---|---|
| 4,878,193 A * | 10/1989 | Bernstein | ................ | G06F 7/505 708/670 |
| 7,401,110 B1 * | 7/2008 | Rarick | ...................... | G06F 7/57 708/700 |
| 8,990,514 B2 * | 3/2015 | Mamidala | ............. | G06F 15/167 711/147 |
| 2005/0089169 A1 * | 4/2005 | Kim | ........................ | H04L 9/001 380/263 |
| 2005/0156704 A1 * | 7/2005 | Gardner | ............. | H01F 17/0006 336/232 |
| 2006/0280304 A1 * | 12/2006 | Waters | .................... | H04J 14/02 380/256 |
| 2007/0192656 A1 * | 8/2007 | Goessel | .................. | G06F 11/10 714/719 |

(Continued)

FOREIGN PATENT DOCUMENTS

JP 2001024558 A * 1/2001 ............ H04W 52/40

OTHER PUBLICATIONS

A SCA-resistant Processor Architecture Based on Random Delay Insertion presented at ICCCT on Feb. 26-27, 2015 by Zhangquing et al.*

*Primary Examiner* — Shin-Hon (Eric) Chen
*Assistant Examiner* — Richard A McCoy
(74) *Attorney, Agent, or Firm* — Norton Rose Fulbright US LLP; Gerard Messina

(57) ABSTRACT

A processing device including a primary processing unit and at least one secondary processing unit, the primary processing unit being designed to subject primary digital input data to a predefinable first data processing, the secondary processing unit being designed to subject secondary digital input data to a predefinable second data processing, the processing device being designed to delay the second data processing by the at least one secondary processing unit at least intermittently in relation to the first data processing by the primary processing unit.

22 Claims, 1 Drawing Sheet

(56) References Cited

U.S. PATENT DOCUMENTS

| | | | |
|---|---|---|---|
| 2007/0277070 A1* | 11/2007 | Janke | G06F 11/2215 |
| | | | 714/736 |
| 2011/0208946 A1* | 8/2011 | Prokopenko | G06F 7/483 |
| | | | 712/22 |
| 2014/0126444 A1* | 5/2014 | Tseng | G06F 1/3209 |
| | | | 370/311 |

* cited by examiner

PROCESSING DEVICE AND OPERATING METHOD THEREFOR

CROSS REFERENCE

The present application claims the benefit under 35 U.S.C. § 119 of German Patent Application No. DE 102015209123.6 filed on May 19, 2015, which is expressly incorporated herein by reference in its entirety.

FIELD

The present invention relates to a processing device including a primary processing unit and at least one secondary processing unit, the primary processing unit being designed to subject primary digital input data to a predefinable first data processing, and the secondary processing unit being designed to subject secondary digital input data to a predefinable second data processing.

The present invention further relates to a method for operating a processing device of the above-described type.

BACKGROUND INFORMATION

Conventional devices and methods are used, among other things, to carry out cryptographic procedures or in general to process security-relevant data, in particular in the field of IT security. Conventionally, the aforementioned systems and methods, or more precisely their specific implementation as hardware and software, are attackable in a target system, such as a multi-core microcontroller or the like, using so-called side channel attacks. In these side channel attacks, one or multiple physical parameters (e.g., power consumption, electromagnetic radiation and the like) of a system to be attacked are detected and analyzed with respect to a correlation with secret data, such as secret keys of cryptographic procedures. An attacker is then able to obtain information therefrom about the secret key and/or the processed data.

Another class of attacks against the aforementioned systems and methods is to actively introduce, i.e., inject, faults into the system as a method is being carried out. These attacks are also referred to as fault injection attacks.

SUMMARY

It is an object of the present invention to improve a processing device and a method to the effect that increased security is provided against side channel attacks and/or fault injection attacks.

This object may be achieved in accordance with an example embodiment of the present invention in that the processing device is designed to delay the second data processing by the at least one secondary processing unit at least intermittently in relation to the first data processing by the primary processing unit. This advantageously achieves that a lower correlation between potentially identical or similar algorithms or data processing processes carried out on the different processing units is obtained, which increases the security against side channel attacks. This effect may also be interpreted as an amplification of the "algorithmic noise," which makes the side channel attacks more difficult.

In one preferred specific embodiment, it is provided that the processing device is designed to delay the second data processing in a random-dependent and/or pseudorandom-dependent manner. Suitable sources for the generation of random events or random numbers or pseudorandom numbers are provided for this purpose. In general, the delay according to the present invention by the processing device may be brought about, for example, in that a reference clock signal for the processing unit to be correspondingly delayed is influenced by the processing device, for example is decreased with respect to its clock frequency or even stopped intermittently. Random-dependent and pseudorandom-dependent delays may also be combined with each other according to one specific embodiment, or intermittently random-dependent and intermittently pseudorandom-dependent delays are provided.

In one further advantageous specific embodiment, it is provided that the processing device is designed to delay individual data processing steps and/or groups of multiple consecutive data processing steps of the second data processing. The delay of the second data processing between respective individual data processing steps results in particularly increased security.

In one further advantageous specific embodiment, it is provided that the processing device is designed to modify a manner (or a method), according to which the second data processing is delayed in a random-dependent and/or pseudorandom-dependent manner, as a function of a time and/or as a function of an event and/or in a random-dependent manner and/or in a pseudorandom-dependent manner. This means that the rule, according to which the delay according to the present invention of the at least one secondary processing unit is carried out, may be made dependent, for example, on the occurrence of one or multiple events and/or on a time and, alternatively or additionally, dependent on random data and/or pseudorandom data.

In one further advantageous specific embodiment, it is provided that the processing device is designed to at least intermittently invert the primary digital input data to obtain the secondary digital input data. In this way, it is possible to make input data which are inverse in relation to each other available to different processing units for essentially identical or at least similar data processings in these processing units, whereby the security against side channel attacks may be increased further. In particular, compensation effects with respect to the physical parameters detectable within the scope of side channel attacks (e.g., power consumption, electromagnetic radiation and the like) may result at least intermittently when processing the primary digital input data and the secondary digital input data which are inverse thereto in the different processing units, which may still further increase the security of the processing device.

In one further advantageous specific embodiment, it is provided that the processing device is designed to infer an operating state, in particular a fault, of the primary processing unit and/or of the at least one secondary processing unit as a function of digital output data of the primary processing unit and the at least one secondary processing unit. In this way, the robustness of the processing device according to the present invention against faults may be particularly advantageously increased.

In one further advantageous specific embodiment, it is provided that an inverting unit is provided, which is designed to form the secondary digital input data as a function of the primary digital input data.

In one further advantageous specific embodiment, it is provided that a hardware structure of at least one secondary processing unit is generally identical to a hardware structure of the primary processing unit.

In one further advantageous invention variant, it is provided that the first data processing is generally identical to the second data processing.

As a result of the above-described invention variants, so-called multi-core processing devices may be provided, for example, which redundantly process predefinable algorithms by way of a corresponding data processing, whereby an increased security against faults of individual processing units exists. In combination with the optionally possible supply of at least one (secondary) processing unit with input data which are inverse in relation to the input data of other processing units, an increased security against side channel attacks is achievable at the same time.

In one particularly preferred specific embodiment, the processing device is designed to carry out a cryptographic procedure and/or at least a part thereof, in particular the first and second data processings including at least substeps of one or multiple cryptographic algorithms. In one particularly preferred variant, the delay according to the present invention of the second data processing is carried out by the secondary processing unit as a function of the type of the cryptographic procedure or of the cryptographic algorithm.

In a further advantageous specific embodiment, it is provided that the primary processing unit and the secondary processing unit are situated on the same semiconductor die and/or are connected to the same electrical energy supply, whereby side channel attacks are made even more difficult.

Further embodiments, features and advantages of the present invention are described below with reference to the figures.

DETAILED DESCRIPTION OF EXAMPLE EMBODIMENTS

Figure 1:
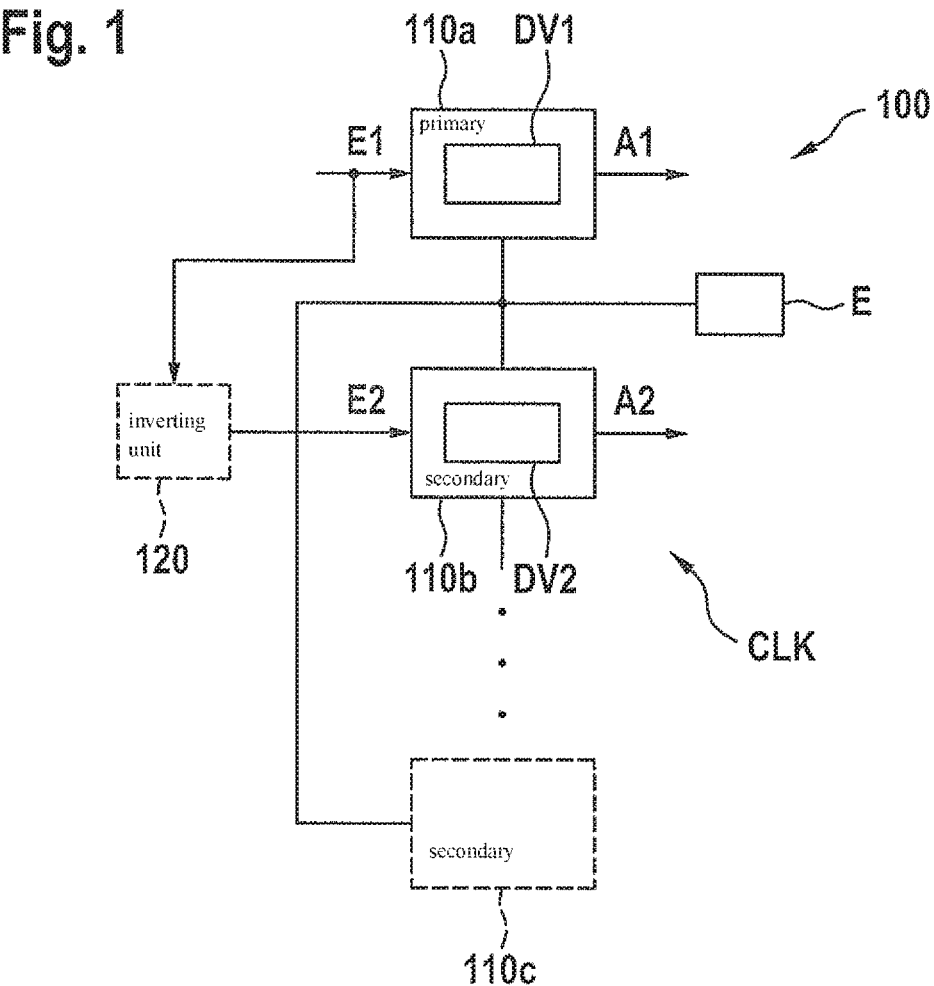
FIG. 1 schematically shows a block diagram of one specific embodiment of a processing device according to the present invention.

FIG. 1 schematically shows a processing device 100, which includes a primary processing unit 110a and a secondary processing unit 110b. Optionally, it is also possible for further secondary processing units to be present, as is indicated by the further secondary processing unit 110c and the vertical dotting between components 110b, 110c.

Primary processing unit 110a is designed to subject primary digital input data E1 to a predefinable first data processing DV1, and secondary processing unit 110b is designed to subject secondary digital input data E2 to a predefinable second data processing DV2.

Data processings DV1, DV2 may be cryptographic processes, for example, or parts thereof, or corresponding algorithms.

An energy supply unit E is provided for the electrical energy supply, which in the present example supplies all processing units 110a, 110b, 110c.

According to the present invention, it is provided that processing device 100 is designed to delay second data processing DV2 by the at least one secondary processing unit 110b at least intermittently in relation to first data processing DV1 by primary processing unit 110a. This results in a decorrelation of the operation of the two processing units 110a, 110b, which is advantageous in particular when processing similar or identical data processing steps occasionally on the same or similar data, in order to increase the security against side channel attacks.

Processing device 100 is particularly preferably designed to delay second data processing DV2 in a random-dependent and/or pseudorandom-dependent manner. For example, such a delay may take place in that a clock signal CLK supplied to secondary processing unit 110b via a clock line is influenced by processing device 100, for example with respect to its frequency. It is also possible that processing device 100 at least intermittently stops clock signal CLK for second processing unit 110b, or "freezes" it in the instantaneously present state, to effectuate the delay according to the present invention. As was already described, the degree of the delay may be ascertained in a random-dependent manner or a pseudorandom-dependent manner or a combination thereof.

As an alternative or in addition, a delay in second data processing DV2 may take place in that pseudo instructions are introduced into the stream of instructions to be processed by secondary processing unit 110b, e.g., one or multiple no-operation (NOP) instructions. As an alternative or in addition, a delay in second data processing DV2 may take place in that a program pointer of the second processing unit is modified within the meaning of the delay, and so forth.

A comparable delay is also popssible for the operation of further secondary processing units 110c of processing device 100.

In one preferred specific embodiment, the random-dependent and/or pseudorandom-dependent ascertainment of the delay to be used according to the present invention may be carried out as a function of an initialization value specific to each processing unit 110a, 110b, 110c, which is situated in a memory (not shown) of processing device 100 or of the particular processing unit 110a, 110b, 110c, for example.

A particular increase in the security of processing device 100 against side channel attacks exists when the delay according to the present invention of the at least one secondary processing unit 110b, 110c takes place based on individual data processing steps or of groups thereof, i.e., when random-dependent or pseudorandom-dependent delays are effectuated in each case between individual data processing steps, or at least between groups including few steps.

In one further advantageous specific embodiment, it may be provided that the value ranges for the delays to be used, or the pseudorandom patterns or other characteristics of the delays to be used, are established as a function of the data processing steps or algorithms to be processed by processing units 110a, 110b, 110c, e.g., also dynamically, i.e., during an ongoing data processing DV1, DV2.

It is furthermore particularly advantageous if a way, according to which second data processing DV2 is delayed in a random-dependent and/or pseudorandom-dependent manner, is modified as a function of a time and/or as a function of an event and/or in a random-dependent manner and/or in a pseudorandom-dependent manner. This functionality may be carried out, e.g., by processing device 100 or a processing core specifically provided for this purpose, if necessary, or a further processing unit which is designed similarly or identically to processing units 110a, 110b, 110c.

In one further advantageous specific embodiment, it is provided that processing device 100 is designed to at least intermittently invert primary digital input data E1 to obtain secondary digital input data E2. In this way, for example, processing units 110a, 110b are able to carry out essentially comparable algorithms on input data which are inverse to each other, whereby an option of a comparison of the correspondingly obtained output data A1, A2 exists, which effectuates a further increase in the reliability of processing device 100.

For example, an operating state, in particular a fault, of primary processing unit 110a and/or of at least one secondary processing unit 110b, 110c may be inferred as a function of digital output data A1, A2.

Optionally, an inverting unit 120 may also be provided, which carries out the inversion of the input data.

In one variant, the hardware structure of primary and second processing units 110a, 110b are particularly preferably generally identical to each other, and optionally data processings DV1, DV2 or underlying algorithms may also be generally identical to each other, whereby a redundant processor system may be obtained.

Figure 2:
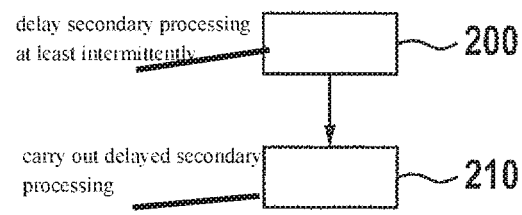
FIG. 2 schematically shows a simplified flow chart of one specific embodiment of the method according to the present invention.

FIG. 2 schematically shows a simplified flow chart of one specific embodiment of the method according to the present invention. In step 200, according to the present invention, a second data processing DV2 (FIG. 1) by the at least one secondary processing unit 110b is at least intermittently delayed in relation to first data processing DV1 by primary processing unit 110a. In step 210, delayed data processing DV2 is finally carried out by secondary processing unit 110b. First data processing DV1, e.g., may be carried out during step 200.

The present invention may advantageously be used in existing processing devices, such as microcontrollers and/or (micro)processors and/or digital signal processors and is able to significantly increase the security against side channel attacks and fault injection attacks. In particular, it is also possible in this way to secure algorithms, in particular cryptographic algorithms, which are executable in parallel on multiple processing units or cores of a multi-core processing device.

What is claimed is:

1. A processing device, comprising:
a primary processing unit including hardware;
and at least one secondary processing unit including hardware,
the primary processing unit being configured to subject primary digital input data to a first data processing,
the secondary processing, unit being configured to subject secondary digital input data to a second data processing;
wherein the processing device is configured to carry out at least a part of a cryptographic procedure,
the first data processing and the second data processing each include processing an identical collection of substeps of at least one cryptographic algorithm;
wherein the processing device is configured to delay, in relation to the first data proccessing of the primary processing unit, the second data processing of the secondary processing unit in at least one of a random-dependent and a pseudorandom-dependent manner to randomly decorrelate execution of the substeps of the primary processing unit with execution of the substeps of the secondary processing unit so as to increase security against a side channel attack by preventing, in response to the random decorrelation, detection of the cryptographic algorithm by a side channel attacker attempting to detect the cryptographic algorithm using the side channel attack;
and wherein the processing device is configured, based on a comparison of first digital output data created by the first data processing to second digital output data created by the second data processing when the identical collection of substeps have been executed by the primary processing unit and the secondary processing unit to create the first and second digital output data,
to infer a normal operating state of the primary processing unit when the first digital output data of the primary processing unit and the second digital output data of the secondary processing unit match,
and to infer a fault operating state of the primary processing unit when the first digital output data of the primary processing unit and the second digital output data of the secondary processing unit do not match.

2. The processing device as recited in claim 1, wherein the delay, by the processing device, delays at least one of individual data processing steps and groups of multiple consecutive data processing steps, of the second data processing, in the at least one of the random-dependent and the pseudorandom-dependent manner.

3. The processing device as recited in claim 1, wherein the processing device is configured to modify a way, according to which the second data processing is delayed in the at least one of a random-dependent and pseudorandom-dependent manner, the modifying being at least one of: as a function of a time, as a function of an event, in a random-dependent manner, and in a pseudorandom-dependent manner.

4. The processing device as recited in claim 1, wherein the processing device is configured to at least intermittently invert the primary digital input data to obtain the secondary digital input data.

5. The processing device as recited in claim 1, wherein an inverting unit is provided, which is configured to form the secondary digital input data as a function of the primary digital input data.

6. The processing device as recited in claim 1, wherein a hardware structure of the secondary processing unit is essentially identical to a hardware structure of the primary processing unit.

7. The processing device as recited in claim 1, wherein the primary processing unit and the secondary processing unit are at least one of: situated on the same semiconductor die, and connected to a same electrical energy supply.

8. The processing device as recited in claim 1, wherein the primary processing unit and the secondary processing unit are situated together on the same semiconductor die.

9. The processing device as recited in claim 1, wherein the processing device effectuates the delay by controlling a clock to change a frequency of a clock signal supplied to the secondary processing unit by the clock.

10. The processing device as recited in claim 1, wherein the processing device effectuates the delay by controlling a clock to freeze, in an instantaneously present state, a clock signal supplied to the secondary processing unit by the clock.

11. The processing device as recited in claim 1, wherein the delay is effectuated by inserting at least one no-operation (NOP) instructions in a stream of instructions to processed by the secondary processing unit.

12. The processing device as recited in claim 1, wherein the primary processing unit is a first core of a multi-core processor, and the secondary processing unit a second core of the multi-core processor, the first core being separate from the second core.

13. The processing device as recited in claim 1, wherein for the random decorrelation, the processing device is configured to delay only the second data processing of the secondary processing unit and not the first data processing of the primary processing unit.

14. The processing device as recited in claim 1, wherein, prior to the comparison by the processing device:

the primary processing unit receives and processes the primary digital input data to provide the first digital output data of the primary processing unit, and the processing device is configured to randomly invert the primary digital input data and to provide the inverted primary digital data to the secondary processing unit, the secondary processing unit processing the inverted primary digital data to provide the second digital output data of the secondary processing unit.

15. A method for operating a processing device, the processing device including a primary processing unit and at least one secondary processing unit, the primary processing unit being configured to subject primary digital input data to a first data processing, the secondary processing unit being configured to subject second digital input data to a second data processing, the method comprising:

carrying out, the processing device, at least apart of a cryptographic procedure, the carrying out including the primary processing unit performing the first data processing and the secondary processing unit performing the second data processing, wherein the first data processing and the second data processing each include processing an identical collection of substeps of the cryptographic procedure;

delaying the second data processing of the secondary processing unit at least intermittently in relation to the first data processing of the primary processing unit;

wherein the delaying, in relation to the first data processing by the primary processing unit, delays the second data processing of the secondary processing unit in at least one of a random-dependent and a pseudorandom-dependent manner to randomly decorrelate execution of the substeps of the primary processing unit with execution of the substeps of the secondary processing unit so as to increase security against a side channel attack by preventing, in response to the random decorrelation, detection of the cryptographic algorithm by a side channel attacker attempting to detect the cryptographic algorithm using the side channel attack, wherein the processing device is configured, based on a comparison of first digital output data created by the first data processing to second digital output data created by the second data processing when the identical collection of substeps have been executed by the primary processing unit and the secondary processing unit to create the first and second digital output data, to infer a normal operating state of the primary processing unit when the first digital output data of the primary processing unit and the second digital output data of the secondary processing unit match, and to infer a fault operating state of the primary processing unit when the first digital output data of the primary processing unit and the second digital output data of the secondary processing unit do not match.

16. The method as recited in claim 15, wherein the primary processing unit and the secondary processing unit are situated together on the same semiconductor die.

17. The method as recited claim 15, wherein the processing device effectuates the delaying by controlling a clock to change a frequency of a clock signal supplied to the secondary processing unit by the clock.

18. The method as recited claim 15, wherein the processing device effectuates the delaying by controlling a clock to freeze, in an instantaneously present state, a clock signal supplied to the secondary processing unit by the clock.

19. The method as recited in claim 15, wherein the delaying is effectuated by inserting at least one no-operation (NOP) instructions in a stream of instructions to processed by the secondary processing unit.

20. The method as recited in claim 15, wherein the primary processing unit is a first core of a multi-core processor, and the secondary processing unit a second core of the multi-core processor, the first core being separate from the second core.

21. The method as recited in claim 15, wherein for the random decorrelation, the processing device is configured to delay only the second data processing of the secondary processing unit and not the first data processing of the primary processing unit.

22. The method as recited in claim 15, wherein, prior to the comparison by the processing device:

the primary processing unit receives and processes the primary digital input data to provide the first digital output data of the primary processing unit, and the processing device is configured to randomly invert the primary digital input data and to provide the inverted primary digital data to the secondary processing unit, the secondary processing unit processing the inverted primary digital data to provide the second digital output data of the secondary processing unit.

* * * * *